US011923705B2

(12) United States Patent
Zhang

(10) Patent No.: US 11,923,705 B2
(45) Date of Patent: Mar. 5, 2024

(54) BATTERY CONTROL SYSTEM AND METHOD, AND ELECTRONIC DEVICE

(71) Applicant: GUANGDONG OPPO MOBILE TELECOMMUNICATIONS CORP., LTD., Guangdong (CN)

(72) Inventor: Jialiang Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 681 days.

(21) Appl. No.: 17/110,967

(22) Filed: Dec. 3, 2020

(65) Prior Publication Data

US 2021/0091576 A1 Mar. 25, 2021

Related U.S. Application Data

(63) Continuation of application No. PCT/CN2019/091992, filed on Jun. 20, 2019.

(30) Foreign Application Priority Data

Aug. 1, 2018 (CN) .......................... 201810867081.3

(51) Int. Cl.
*H02J 7/24* (2006.01)
*H02J 7/00* (2006.01)
(52) U.S. Cl.
CPC ........ *H02J 7/0024* (2013.01); *H02J 7/00045* (2020.01); *H01M 2220/00* (2013.01)
(58) Field of Classification Search
CPC . H02J 7/0024; H02J 7/00045; H01M 2220/00
(Continued)

(56) References Cited

U.S. PATENT DOCUMENTS 7,148,442 B2 * 12/2006 Murai ...................... B23H 7/04
219/69.13
7,911,179 B2 * 3/2011 Nakanishi ............. H02J 7/0016
320/124
(Continued)

FOREIGN PATENT DOCUMENTS

CN 103915657 A 7/2014
CN 104092266 A 10/2014
(Continued)

OTHER PUBLICATIONS

Ida et al., Japanese Patent Document No. JP-2014193033-A, published Oct. 6, 2014, 5 pages including novelty, claims and 1 drawing (Year: 2014).*

(Continued)

*Primary Examiner* — Phallaka Kik
(74) *Attorney, Agent, or Firm* — Young Basile Hanlon & MacFarlane, P.C.

(57) ABSTRACT

A battery control system, comprising: a number of battery components used for storing electric energy and supplying power for a load; a number of switch units connected to a number of battery components to form a charge/discharge branch and used for turning on or off the charge/discharge branch where the battery components are located; and a first control unit connected to a number of switch units separately and used for receiving a charge control signal to control the on/off of a number of switch units so that a number of switch units is connected in series to form a serial charge branch, and used for receiving a discharge control signal to control the on/off of a number of switch units so that a number of battery components is connected in parallel to form a parallel discharge branch.

14 Claims, 10 Drawing Sheets

(58) Field of Classification Search
USPC .................. 320/117, 118, 125, 126, 121
See application file for complete search history.

(56) References Cited

U.S. PATENT DOCUMENTS

| | | | | |
|---|---|---|---|---|
| 8,643,340 | B1* | 2/2014 | Kamath | H02J 7/345 326/115 |
| 8,975,870 | B2* | 3/2015 | Maruyama | H02J 7/0016 320/118 |
| 2004/0104708 | A1* | 6/2004 | Zhang | H02J 7/00306 320/136 |
| 2008/0278116 | A1* | 11/2008 | Matsunaga | H01M 10/48 320/134 |
| 2009/0066291 | A1* | 3/2009 | Tien | H02J 7/0016 320/118 |
| 2010/0231166 | A1* | 9/2010 | Lee | H02J 7/0018 320/118 |
| 2011/0181245 | A1* | 7/2011 | Wey | H02J 7/0016 320/118 |
| 2012/0091966 | A1* | 4/2012 | Mori | H01M 10/44 320/160 |
| 2013/0106355 | A1* | 5/2013 | Kim | H02J 7/0025 320/118 |
| 2013/0113430 | A1* | 5/2013 | Kim | H02J 7/0032 320/136 |
| 2013/0181681 | A1* | 7/2013 | Mukai | H01M 10/425 320/128 |
| 2013/0221924 | A1* | 8/2013 | Sim | H02J 7/0063 320/112 |
| 2014/0191693 | A1* | 7/2014 | Funaba | H02P 27/06 318/139 |
| 2014/0210405 | A1* | 7/2014 | Yang | H02J 7/0044 320/108 |
| 2014/0239896 | A1* | 8/2014 | Takeshita | H02J 7/00306 320/117 |
| 2015/0188346 | A1 | 7/2015 | Oku | |
| 2015/0357928 | A1* | 12/2015 | Itakura | H02J 7/0068 320/128 |
| 2016/0099588 | A1* | 4/2016 | Bae | H02J 7/00047 320/117 |
| 2016/0219664 | A1* | 7/2016 | Ellenberger | H05B 45/375 |
| 2016/0241057 | A1* | 8/2016 | Yang | H02J 7/0024 |
| 2016/0352126 | A1* | 12/2016 | Huang | H02J 7/00306 |
| 2018/0109133 | A1* | 4/2018 | Wei | H02J 7/34 |
| 2018/0375177 | A1* | 12/2018 | Mori | H02J 1/10 |
| 2019/0006868 | A1* | 1/2019 | Song | H03K 5/24 |
| 2019/0089023 | A1* | 3/2019 | Sastry | H01M 50/269 |
| 2019/0214833 | A1* | 7/2019 | Li | H01M 10/441 |
| 2020/0350779 | A1* | 11/2020 | Tikhonski | H02J 9/068 |
| 2021/0091576 | A1* | 3/2021 | Zhang | H02J 7/0024 |

FOREIGN PATENT DOCUMENTS

| | | | |
|---|---|---|---|
| CN | 104167778 A | 11/2014 | |
| CN | 106451669 A | 2/2017 | |
| CN | 106537725 A | 3/2017 | |
| CN | 107221995 A | 9/2017 | |
| CN | 207368684 U | 5/2018 | |
| CN | 207530551 U | 6/2018 | |
| EP | 3309924 A1 | 4/2018 | |
| JP | 2014168321 A * | 9/2014 | ............ H02J 7/0024 |
| WO | 2016019498 A1 | 2/2016 | |

OTHER PUBLICATIONS

Cen et al., Chinese Patent Document No. CN-108199457-A, published Jun. 22, 2018, 3 pages, including abstract, claims and 1 drawing. (Year: 2018).*

Huang, Chinese Patent Document No. CN-201075737-Y, published Jun. 18, 2008, 4 pages, including novelty, claims and 1 drawing. (Year: 2008).*

OA with English Translation for CN application 201810867081.3 mailed Sep. 23, 2020.

ISR with English Translation for PCTCN2019091992 mailed Sep. 2, 2019.

Chinese Second Office Action with English Translation for CN Application 201810867081.3 dated Mar. 2, 2021. (12 pages).

Extended European Search Report for EP Application 19844061.2 dated Jul. 7, 2021. (11 pages).

* cited by examiner

BATTERY CONTROL SYSTEM AND METHOD, AND ELECTRONIC DEVICE

CROSS-REFERENCE TO RELATED APPLICATION(S)

This application is a continuation application of International Application No. PCT/CN2019/091992, filed on Jun. 20, 2019, which claims priority to Chinese Patent Application No. 2018108670813 filed on Aug. 1, 2018, the entire contents of which are incorporated herein by reference.

TECHNICAL FIELD

The present disclosure relates to a field of charging and discharging technologies, and more particularly, to a battery control system and a battery control method, and an electronic device.

BACKGROUND

Related electronic devices are mainly powered by a single battery, which has limited capacity and is applicable in limited usage scenarios.

SUMMARY

Embodiments of the present disclosure provide a battery control system and a battery control method, and an electronic device.

The battery control system includes: a number of battery components, configured to store electrical energy and to supply power to a load; a number of switch units coupled to a number of the battery components, and configured to switch connection modes of a number of battery components to form various types of charging-discharging paths; and a first control unit coupled to the plurality of the switch units correspondingly and configured to control switching of the plurality of the switch units in response to receiving a charging control signal, to form a series charging path by arranging the plurality of the battery components in series, or configured to control the switching of the plurality of the switch units in response to receiving a discharging control signal, to form a plurality of parallel discharging paths by arranging the plurality of the battery components in parallel.

A battery control method, applicable to a battery control system, in which the battery control system includes a number of battery components and a number of switch units, a number of the battery components are configured to store electrical energy and supply power to a load, and a number of the switch units are coupled to a number of the battery components. The method includes: receiving a charging control signal or a discharging control signal; and controlling switching of the plurality of the switch units in response to receiving the charging control signal, to form a charging path by arranging the plurality of the battery components in series, or controlling the switching of the plurality of the switch units in response to receiving the discharging control signal, to form a plurality of parallel discharging paths by arranging the plurality of the battery components in parallel.

An electronic device includes a number of battery components, a number of switch units, a memory and a processor, in which the processor is coupled to a number of the battery components, a number of the switch units and the memory correspondingly, and the memory is configured to store a computer program, when the computer program is executed by the processor, the processor is configured to perform the following acts: receiving a charging control signal or a discharging control signal; and controlling switching of the plurality of the switch units in responding to receiving the charging control signal, to form a charging path by arranging the plurality of the battery components in series; or controlling the switching of the plurality of the switch units in responding to receiving the discharging control signal, to form a plurality of parallel discharging paths by arranging the plurality of the battery components in parallel.

The details of one or more embodiments of the present disclosure are proposed in the following drawings and description. Additional features, objects and advantages of the present disclosure will become apparent from the description, drawings and claims.

BRIEF DESCRIPTION OF DRAWINGS

In order to clearly illustrate technical solutions of embodiments of the present disclosure or in the related art, a brief description of drawings used in embodiments or in the related art is given below. Obviously, the drawings in the following descriptions are only part embodiments of the present disclosure, and for those skilled in the art, other drawings can be obtained according to these drawings without creative labor.

DETAILED DESCRIPTION

In order to make the purpose, technical solution and advantages of the present disclosure clear, the present disclosure is described in further detail in combination with the accompanying drawings and embodiments. It should be understood that the specific embodiments described herein are only used to explain the present disclosure, and are not used to limit the present disclosure.

It is understood that the terms such as "first", and "second", used in this disclosure may be used herein to describe various elements, but these elements are not limited by these terms. These terms are only used to distinguish a first element from other element. For example, without departing from the scope of the present disclosure, a first battery component may be referred to as a second battery component, and similarly, the second battery component may be referred to as the first battery component. Both the first battery component and the second battery component are battery components, but they are not the same battery component.

Figure 1:
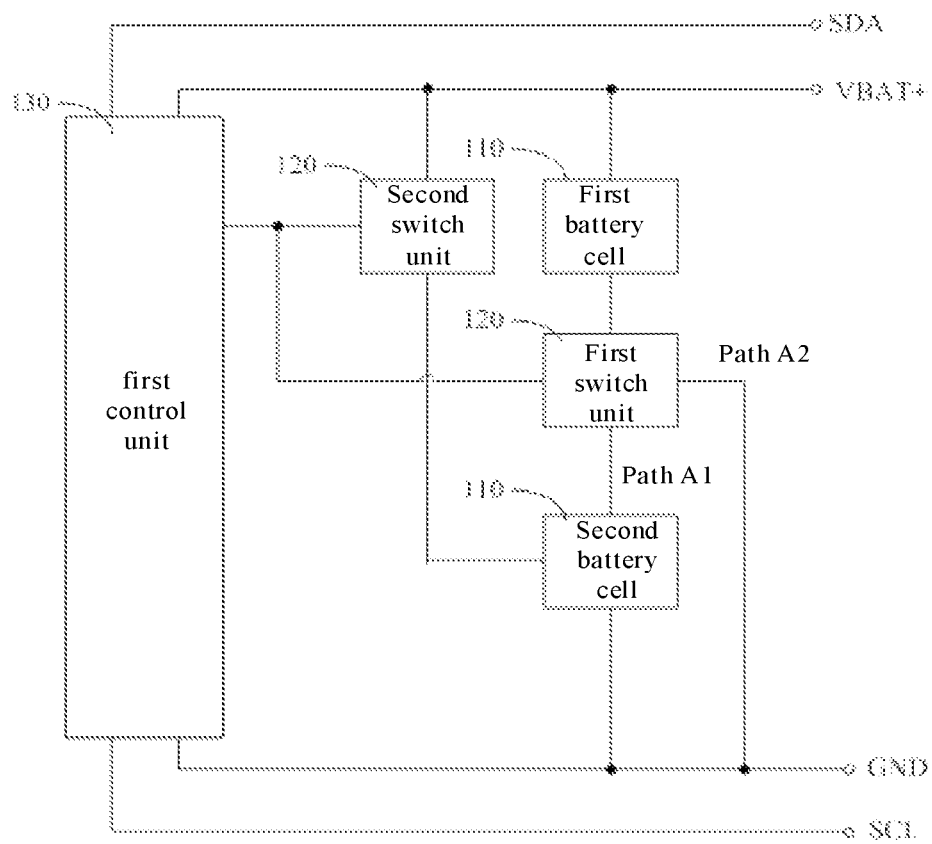
FIG. 1 is a schematic diagram of a circuit frame of a battery control system according to an embodiment.

The embodiments of the present disclosure provide a battery control system. As illustrated in FIG. 1, the battery control system includes a number of battery components 110, a number of switch units 120 and a first control unit 130. A number of the battery components 110 are configured to store electrical energy and to supply power to a load, that is, each battery component 110 is capable of storing electrical energy and supplying power to the load, and the load is coupled to a positive output end VBAT+ of the battery control system.

It should be noted that in this disclosure, "a number of" is understood as at least two (greater than or equal to 2), that is, "a number of" means 2, 3 or even more.

The load is understood as a module to be powered in an electronic device that may be embedded with a power supply device. The electronic device may be any terminal device, such as a mobile terminal, a tablet computer, a PDA (Personal Digital Assistant), a POS (Point of Sales), an on-board computer, a wearable device.

In an embodiment, a battery type of the battery component 110 may include at least one of a lead-acid battery, a nickel-hydrogen battery, a sodium-sulfur battery, a liquid flow battery, a super-capacitor, a lithium battery, and a flexible battery. The battery types of a number of the battery component 110 may be the same or different. The battery types of batteries in the same battery component are the same, and the number of the batteries included in the same battery component may be 1, 2, 3 or more. When the number of the batteries in the same battery component is greater than one, the batteries in the battery component 110 are coupled in series.

In an embodiment, when there are two battery components 110, the first battery component may be a lithium battery component, and the second battery component may be a flexible battery component. In an embodiment, the lithium battery unit 110 may include two lithium batteries coupled in series, and the flexible battery component 110 may include one flexible battery.

In an embodiment, a range of an output voltage of each battery component 110 may be 2.0 volt to 4.4 volt. It should be understood that the ranges of the output voltages of various battery components 110 may be the same or different, which is not further limited in the embodiments of the present disclosure.

A number of the switch units 120 are coupled to a number of the battery components, and the switch units 120 are configured to switch connection modes of a number of battery components to form various types of charging-discharging paths.

In an embodiment, the types of the switch units 120 may be various. At least one of the switch units 120 may have two power output ends, and the at least one of switch units 120 are configured to control a power source to output to two different power output ends. The switch unit with two power output ends may be a single-pole double-throw switch or a relay, and the remaining switch units 120 may be at least one of a diode, a triode, a relay, a thyristor, a controlled silicon, a MOS tube, and an IGBT tube.

The first control unit 130 is correspondingly coupled to a number of the switch units 120, and is configured to control switching of a number of the switch units 120 in response to receiving a charging control signal, to form a series charging path by arranging the plurality of the battery components in series; or to configured to control the switching of a number of the switch units 120 in response to receiving a discharging control signal, to form a number of parallel discharging paths by arranging the plurality of the battery components in parallel.

It is understood that the first control unit 130 is configured to output a first switching instruction for controlling the switching of a number of the switch units according to the received charging control signal, or output a second switching instruction for controlling the switching of a number of the switch units according to the received discharging control signal.

In an embodiment, the first control unit 130 is understood as a logic control unit. The first control unit 130 may receive a charging control signal, and output the first switching instruction for controlling the switching of a number of the switch units 120 to control switching of a number of the switch units 120, to enable a number of the battery components 110 to be coupled in series to form a series charging path. A total charging voltage of a battery pack included a number of the battery components 110 is a sum of output voltages of each of the battery components 110.

The first control unit 130 may receive the discharging control signal, and output a second switching instruction for controlling the switching of a number of the switch units 120 according to the received discharging control signal, to enable a number of the battery components 110 to be coupled in parallel to form a number of parallel discharging paths. At this time, when the output voltages of various battery components 110 are the same, a total discharging voltage of a battery pack included a number of the battery components 110 is a current output voltage of any of the battery components 110. When input voltages of the various battery components 110 are different, the total output voltage of the battery pack is obtained according to the output voltages of the various battery components 110, based on a parallel voltage calculation method.

Each of the switch units 120 is controlled to be turned on or off by itself, according to the received first switching instruction or the received second switching instruction. The first switching instruction and the second switching instruction received by each of the switch units 120 may be the same or different. For example, the first switching instruction received by the first switch unit 121 is configured to instruct the first switch unit 121 to turn on, or the second switching instruction received by the first switch unit 121 is configured to instruct the first switch unit 121 to turn off for disconnection.

It should be noted that when the first switching instruction or the second switching instruction is configured to control one switch unit 120 to turn on by itself, a specific branch of the switch unit 120 is further controlled to turn on according to type or attribute of the switch unit 120. For example, when the switch unit 120 is a single-pole double-throw switch, a fixed end of the single-pole double-throw switch is controlled to switch on the path required to be coupled, by controlling the fixed end of the single-pole double-throw switch to switch, according to the received first switching instruction.

The above battery control system controls the switching of each switch unit according to the received charging control signal, to enable a number of the battery components to be coupled in series to form the series charging path. The battery control system controls the switching of a number of the switch units according to the discharging control signal, to enable a number of the battery components to be coupled in parallel to form a number of the parallel discharging paths. Therefore, diversified charging voltage and discharging voltage are generated to provide a charging mode that has high voltage and large current, and the charging efficiency is improved. After the charging having high voltage and large current is completed, a number of the battery components may output electric energy within a voltage range for normal loads.

Figure 2:
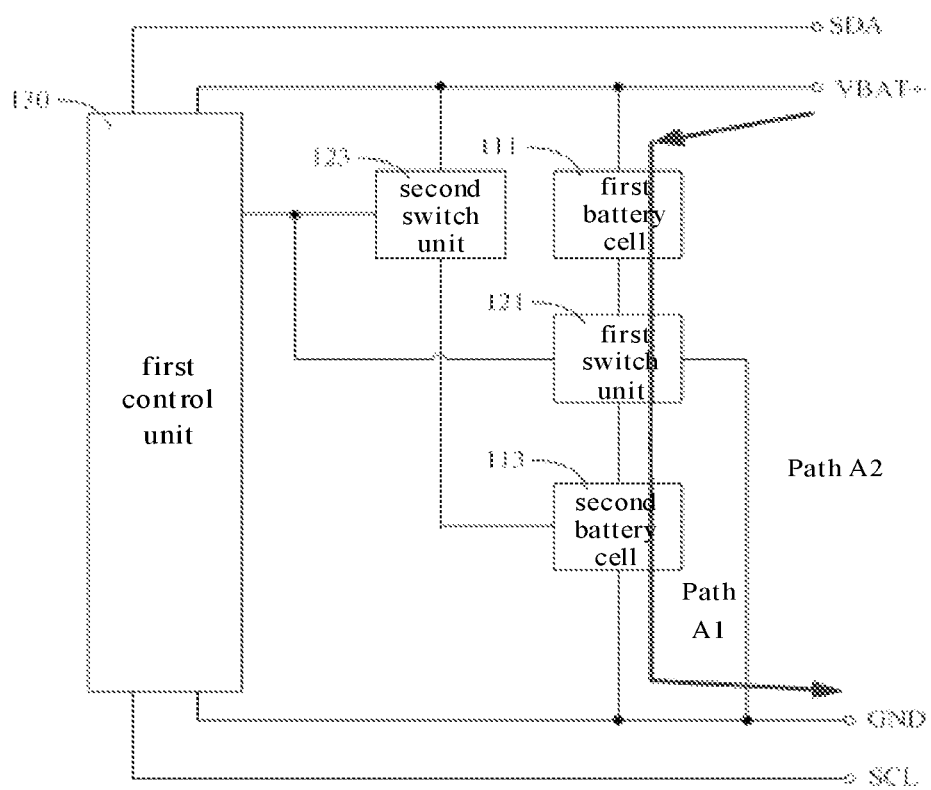
FIG. 2 is a schematic diagram of a current flow direction of a battery control system charging battery components according to an embodiment.

As illustrated in FIG. 2, in an embodiment, a number of the battery components may be a battery pack included two battery components, which includes a first battery component 111 and a second battery component 113. A number of battery components being as the battery pack is configured to supply power to the load. A number of the switch units include a first switch unit 121 and a second switch unit 123.

The first control unit 130 is coupled to the first switch unit 121 and the second switch unit 123 correspondingly. The first control unit 130 is configured to control the first battery component 111, the second switch unit 121, and the second battery component 113 to be coupled in sequence to form a first series charging-discharging path. The first control unit 130 also is configured to control the first battery component 111 and the first switch unit 121 to be coupled to form a first charging-discharging path, and control the second switch unit 123 and the second battery component 113 to be coupled to form a second charging-discharging path. The first battery component is coupled in parallel with the second battery component.

In an embodiment, a first end of the first battery component 111 is coupled to the positive output end VBAT+ of the battery control system, and a second end of the first battery component 111 is coupled to a first end of the second battery component 113 via the first switch unit 121, and the second end of the second battery unit 113 is grounded. The positive output end VBAT+ of the battery control system is understood as the positive output end of the battery pack included a number of the battery components, and a ground end of the battery control system is understood as a ground end of the battery pack.

In an embodiment, the first switch unit 121 includes a first output end and a second output end. The first output end of the first switch unit 121 is coupled to the second battery component 113 to form a path A1, and the second output end of the first switch unit 121 is grounded to form a path A2. The first output end and the second output end of the first switch unit 121 are considered as power supply output ends, and the power supply is controlled to output in two different directions through the first switch unit 121. The first switch unit 121 further includes an input end for coupling an input line of the power source, and the input end is coupled to the first battery component 111. For example, the first switch unit 121 may be a single-pole double-throw switch, a relay, or other switching components with two power output ends.

A first end of the second switch unit 123 is coupled to a positive output end VBAT+, and a second end of the second switch unit 123 is coupled to the second battery component 113, or the second end of the second switch unit 123 is coupled to the path A1 formed by the first switch unit 121 and the second battery component 113.

The first control unit 130 is correspondingly coupled to the first switch unit 121 and the second switch unit 123, and controls the switching of the first switch unit 121 and the second switch unit 123 according to the received charging control signal. And then form the first series charging path is formed through the first battery component 111, the first switch unit 121 and the second battery component 113 to charge the first battery component 111 and the second battery component 113.

In an embodiment, when the battery pack in the battery control system is to be charged, the first control unit 130 receives the corresponding charging control signal. The battery control system outputs the corresponding first switching instruction to the first switch unit 121 and the second switch unit 123 according to the received charging control signal, and controls the input end of the first switch unit 121 to couple to the first output end (that is, switching to the path A1), and the second switch unit 123 is controlled to be powered off and turned off, to enable the first battery component 111 and the second battery component 113 to be coupled in series to form the first series charging path. The first series charging path, as illustrated in an arrow direction of a solid line in FIG. 2, is coupled to a ground end GND from the positive output end VBAT+ of the battery pack through the first battery component 111, the first switch unit 121, and the second battery component 113. During a charging process, the output voltage of the battery pack is a sum of the output voltages of the first battery component 111 and the second battery component 113. That is, during the charging process, the first battery component 111 and the second battery component 113 are coupled in series to achieve high-voltage direct charging, thereby improving charging speed and efficiency.

In an embodiment, the first control unit 130 controls the switching of the first switch unit 121 and the second switch unit 123 according to the received discharging control signal, to enable the first battery component 111 and the first switch unit 121 to form a first discharging path. The second switch unit 123 and the second battery component 113 are controlled to form a second discharging path. The first discharging path is coupled in parallel with the second discharging path.

In an embodiment, when the battery control system is to be supplied power to the load, the first control unit 130 receives the corresponding discharging control signal. The battery control system outputs the corresponding second switching instruction to the first switch unit 121 and the second switch unit 123 according to the received discharging control signal, and controls the input end of the first switch unit 121 to couple to the second output end (that is, switching to the path A2), and controls the second switch unit 123 to be turned on at the same time. And then, the first battery component 111 and the first switch unit 121 form the first discharging path, and the second switch unit 123 and the second battery component 113 form the second discharging path. That is, the first battery component 111 and the second battery component 113 are coupled in parallel. Referring to an arrow direction of a solid line in FIG. 3, the first discharging path is coupled to the ground end GND via the first switch unit 121 and the first battery component 111 to the positive output end VBAT+ of the battery pack. Referring to an arrow direction of a dashed line in FIG. 3, the second discharging path is coupled to the positive output end VBAT+ of the battery pack by the ground end GND via the second battery component 113 and the second switch unit 123. When the output voltage of the first battery component 111 and the output voltage of the second battery component 113 are the same, the output voltage of the battery pack formed by the first battery component 111 and the second battery component 113 is the output voltage of the first battery component 111 or the output voltage of the second battery component 113. That is, during the discharging process, the first battery component 111 and the second battery component 113 are coupled in parallel to output a proper low-voltage signal to supply power to the load.

In an embodiment, the first switching instruction and the second switching instruction are stored in the first control unit 130 according to preset rules. The first control unit 130 is configured to detect a communication protocol between the battery control system and the load, and send the first switching instruction and the second switching instruction according to the preset rules corresponding to the communication protocol.

In an embodiment, the battery control system and the load communicate through I2C communication protocol. As illustrated in FIG. 2, the first control unit 130 is also provided with an I2C communication interface to couple to an I2C serial data line (SDA) and an I2C serial clock line (SCL) correspondingly. The first control unit 130 is coupled to the SDA and the SCL correspondingly through the I2C communication interface. When the communication protocol for the battery control system to communicate with the load is the I2C communication protocol, the first switching instruction and the second switching instruction are sent according to the preset rules corresponding to the communication protocol.

In an embodiment, the first control unit 130 is provided with a register for storing and controlling the first switch unit 121 and the second switch unit 123. The first switching instruction and the second switching instruction for controlling the first switch unit 121 and the second switch unit 123 are directly written into the register, so as to control the switching of the first switch unit 121 and the second switch unit 123. For example, the first switching instruction and the second switching instruction are stored in the form of levels. "1" represents a high-level signal for controlling the switch units to turn on, and "0" represents a low-level signal for controlling the switch units to turn off.

Figure 3:
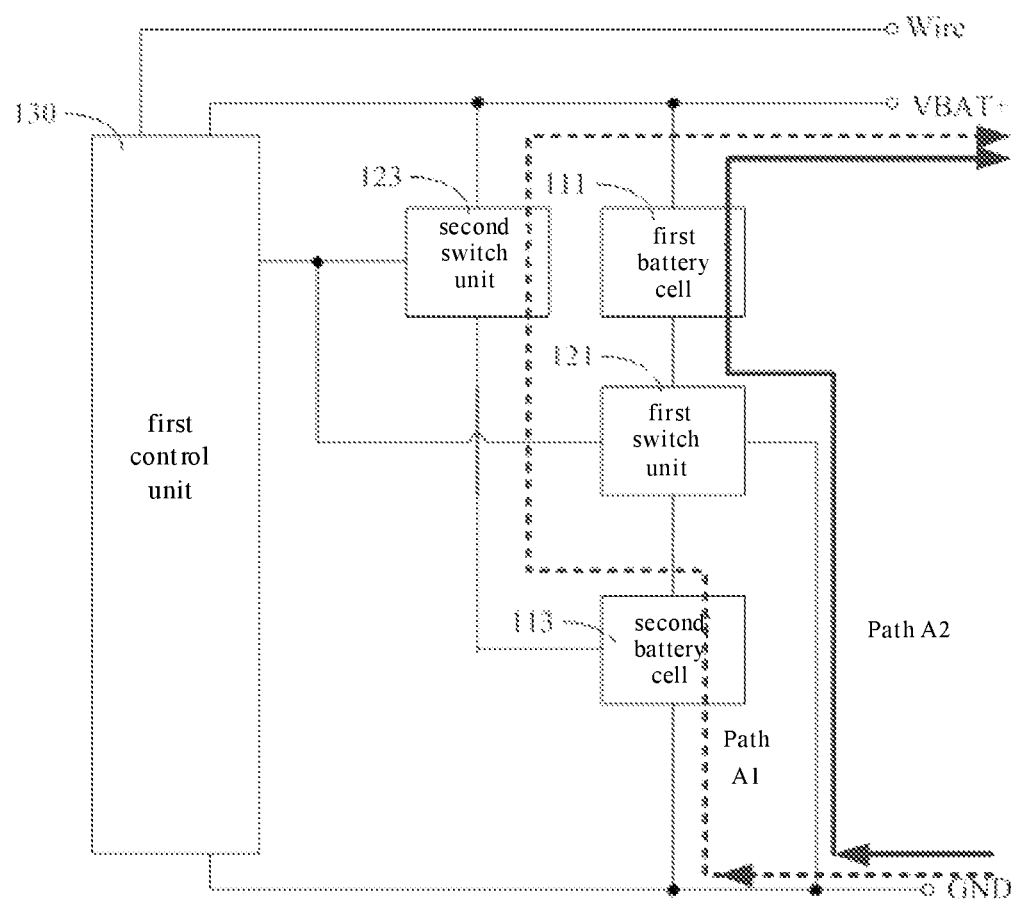
FIG. 3 is a schematic diagram of a current flow direction of a battery control system supplying power to a load according to an embodiment.

In another embodiment, the battery control system and the load communicate through a single-wire protocol. As illustrated in FIG. 3, the first control unit 130 is also provided with a single-wire communication interface for connecting with a single-wire communication line. The single-wire communication interface of the first control unit 130 is coupled to the single-wire communication line. When the communication protocol for the communication between the battery control system and the load is the single-wire protocol, the first switching instruction and the second switching instruction are sent according to the preset rules corresponding to the communication protocol. The first switching instruction and the second switching instruction are stored and sent in form of pulse signals. For example, the load first sends 8 pulse signals on the single-wire communication line to inform the first control unit 130 to prepare for operations. After receiving the pulse signal sent by the load, the first control unit 130 responds with 8 pulse signals, indicating that the first control unit 130 is ready. When the load sends 1 pulse signal, it indicates that the first switch unit 121 is disconnected or turned off. When the load sends 2 pulse signals, it indicates the first switch unit 121 is connected or turned on. When the load sends 3 pulse signals, it indicates the second switch unit 123 is disconnected or turned off. When the load sends 4 pulse signals, it indicates that the second switch unit 123 is turned on and switched to the path A. When the load sends 5 pulse signals, it indicates that the second switch unit 123 is turned on and switched to path B.

It should be noted that the corresponding relation between the number of pulse signals and the first switching instruction is set according to actual requirements, which is not limited to the above examples.

Figure 4:
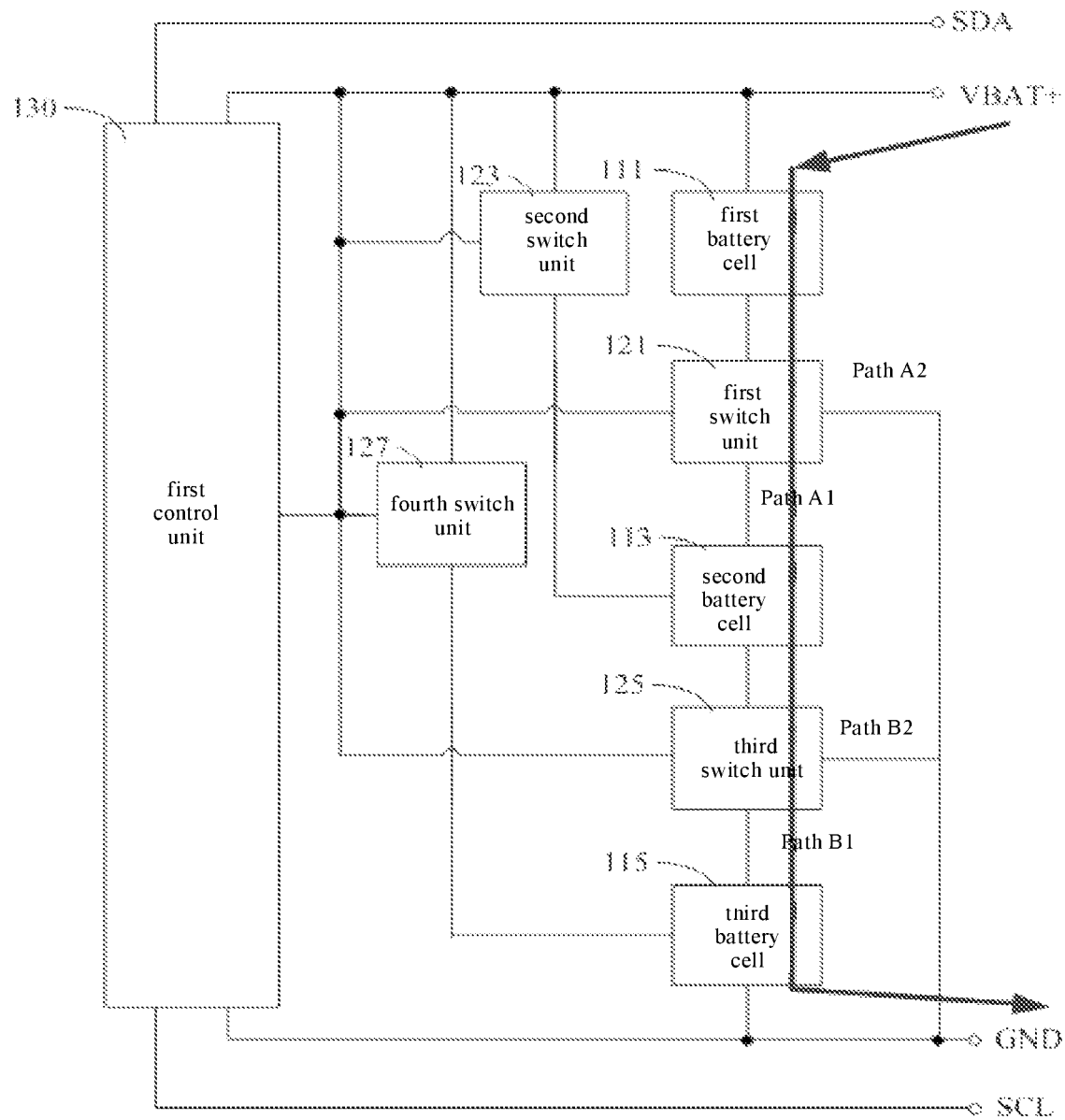
FIG. 4 is a schematic diagram of a current flow direction of a battery control system charging battery components according to another embodiment.

As illustrated in FIG. 4, in an embodiment, a number of the battery components may be a battery pack included three of the battery components, which includes the first battery component 111 and the second battery component 113, and a third battery component 115. A number of the switch units includes the first switch unit 121, the second switch unit 123, a third switch unit 125, and a fourth switch unit 127. The third switch unit 125 and the fourth switch unit 127 are correspondingly coupled to the first control unit 130. The first control unit 130 controls the first battery component 111, the second switch unit 123, and the second battery component 113 to be coupled in sequence to form a second series charging-discharging path. The first control unit 130 controls the first battery component 111 and the first switch unit 121 to be coupled in sequence to form a third charging-discharging path, and controls the second switch unit 123, the second battery component 113, and the third switch unit 125 to be coupled in sequence to form a fourth charging-discharging path, and one embodiment the fourth switch unit 127 and the third battery component 115 are controlled to be coupled to form a fifth charging-discharging path.

In an embodiment, the first battery component 111, the first switch unit 121, the second battery component 113, the third switch unit 125, and the third battery component 115 are sequentially coupled, and a first end of the third battery component 115 is grounded. A first end of the second switch unit 123 is coupled to the positive output end. A first end of the first switch unit 121 is coupled to the second battery component 113, or the first end of the first switch unit 121 is coupled to the path A1 formed by the first switch unit 121 and the second battery component 113. A first end of the fourth switch unit 127 is coupled to the positive output end, a second end of the fourth switch unit 127 is coupled to the third battery component 115, or the second end of the fourth switch unit 127 is coupled to a path B1 formed by the third switch unit 125 and the third battery component 115.

In an embodiment, the first switch unit 121 includes the first output end and the second output end. The first output end of the first switch unit 121 is coupled to the second battery component 113 to form the path A1, and the second output end of the first switch unit 121 is grounded to form the path A2. The third switch unit 125 includes a first output end and a second output end. The first output end of the third switch unit 125 is coupled to the third battery component 115 to form the path B1, and the second output end of the third switch unit 125 is grounded to form a path B2. For example, the first switch unit 121 and the third switch unit 125 may be single-pole double-throw switches, relays, or other switching components with two power output ends.

The first control unit 130 is coupled to the first switch unit 121, the second switch unit 123, the third switch unit 125, and the fourth switch unit 127, correspondingly. In an embodiment, when the battery pack in the battery control system is to be charged, the first control unit 130 outputs the corresponding first switching instruction to the first switch unit 121, the second switch unit 123, the third switch unit 125 and the fourth switch unit 127 according to the received charging control signal. The first switch unit 121 is controlled to switch to the path A1. The second switch unit 123 is controlled to be powered off and turned off. The third switch unit 125 is controlled to switch to the path B1. The fourth switch unit 127 is controlled to be powered off and turned off. Thus, reference to an arrow of a solid line illustrated in FIG. 4, the first battery component 111, the first switch unit 121, the second battery component 113, the third switch unit 125, and the third battery component 115 form a second series charging path to charge the first battery component 111, the second battery unit 113, and the third battery unit 115. During the charging process, the output voltage of the battery pack is a sum of the output voltages of the first battery component 111, the second battery component 113, and the third battery component 115. That is, during the charging process, the first battery component 111, the second battery component 113, and the third battery component 115 are coupled in series to achieve high-voltage direct charging, thereby improving the charging speed and efficiency.

In an embodiment, when the battery control system is to be supplied power to the load, the first control unit 130 outputs the corresponding second switching instruction to the first switch unit 121, the second switch unit 123, and the third switch unit 125 and the fourth switch unit 127 according to the received discharging control signal. The first switch unit 121 is controlled to switch to the path A2. The second switch unit 123 is controlled to be turned on. The third switch unit 125 is controlled to switch to the path B2. The fourth switch unit 127 is controlled to be turned on. In this way, reference to an arrow of a solid line illustrated in FIG. 5, the first battery component 111 and the first switch unit 121 form a third discharging path. Reference to an arrow of a dashed line illustrated in FIG. 5, the second switch unit 123, the second battery component 113, and the third switch unit 125 form a fourth discharging path. Reference to an arrow of a dotted and dashed line illustrated in FIG. 5, the fourth switch unit 127 and the third battery component 115 form a fifth discharging path. The third discharging path, the fourth discharging path, and the fifth discharging path are coupled in parallel, that is, the first battery component 111, the second battery component 113, and the third battery component 115 are coupled in parallel to each other. When the output voltages of the first battery component 111, the second battery component 113, and the third battery component 115 are the same, the output voltage of the battery pack is the output of the first battery component 111, the second battery component 113, or the third battery component 115. That is, during the discharging process, the first battery component 111, the second battery component 113, and the third battery component 115 output a proper low-voltage signal to supply power to the load through parallel connection.

In an embodiment, the battery control system of the battery pack included three battery components communicates with the load in ways such as I2C communication and single-wire communication. The first switching instruction is stored and sent according to the preset rules corresponding to the communication protocol, according to different communication ways, as described in the foregoing embodiments, which will not be repeated here.

In an embodiment, the battery components may also be a battery pack included four, five, six or more battery components. According to the number of the battery components, a corresponding number of the switch units are set reasonably, and then the first control unit 130 outputs the corresponding first switching instruction to each switch unit, according to charging or discharging requirements, thereby controlling the on or off of each switch unit. When the battery pack is to be charged, by controlling the switching of each switch unit, the battery components in the battery pack are coupled in series to form the series charging path to realize high-voltage direct charging and to improve charging speed and efficiency. When the battery pack is to be supplied power to the load, by controlling the switching of each switch unit, the battery components in the battery pack are coupled in parallel to form the parallel discharging paths, so as to output a proper low-voltage signal to supply power to the load.

Figure 6:
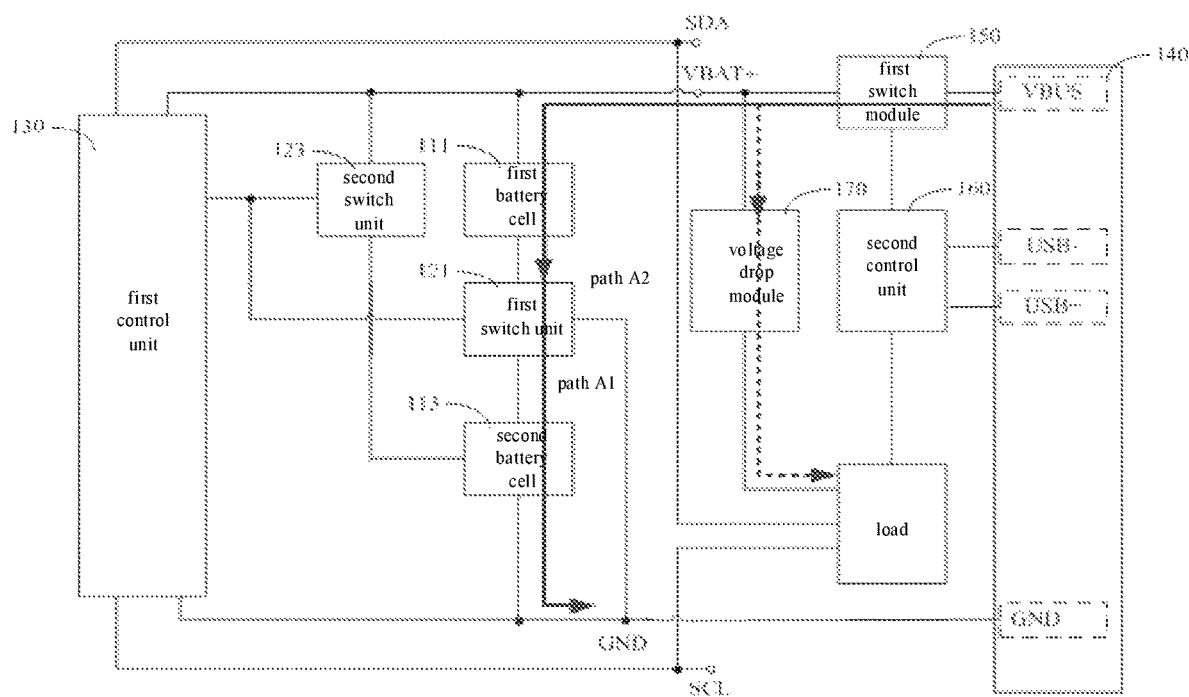
FIG. 6 is a schematic diagram of a current flow direction of a battery control system charging battery components according to another embodiment.

As illustrated in FIG. 6, in an embodiment, the battery control system further includes an interface module 140, a first switch module 150 and a second control unit 160. The interface module 140 is configured to couple to an external charging device. The interface module 140 includes charging ports of VBUS, USB+, USB−, and GND.

The first switch module 150 is correspondingly coupled to the interface module 140 and the first control unit 130 to turn on or turn off the path formed by the interface module 140 and the first control unit 130. In an embodiment, a first end of the first switch module 150 is coupled to the charging port VBUS, and a second end of the first switch module 150 is coupled to the positive output end VBAT+ of the multi-batteries system of the battery pack. The first switch module 150 is configured to turn on or turn off the path formed by the charging port VBUS and the positive output end VBAT+.

In an embodiment, the preset charging device may be understood as a fast charger or a fast charging adapter that provides fast charging for the load. For example, the fast charger or the fast charging adapter provides a charging power greater than 15 W.

The USB signal in the external charging device is a differential signal, and its signal lines are D+ and D−. D+ or D− of the external charging device is provided with a fixed pull-up or pull-down resistor. The USB 1.0/1.1/2.0 protocol defines high/low-speed devices to meet requirements of different situations. For example, D+ of a high-speed device is coupled to a 1.5 kohm pull-up resistor, and D− is not coupled. However the situation of a low-speed device is the opposite. When the battery control system is coupled to the charging device, the second control unit 160 may identify a resistance value of the fixed resistor on D+ or D− of the charging device, and then determine whether the charging device is the preset charging device.

Figure 5:
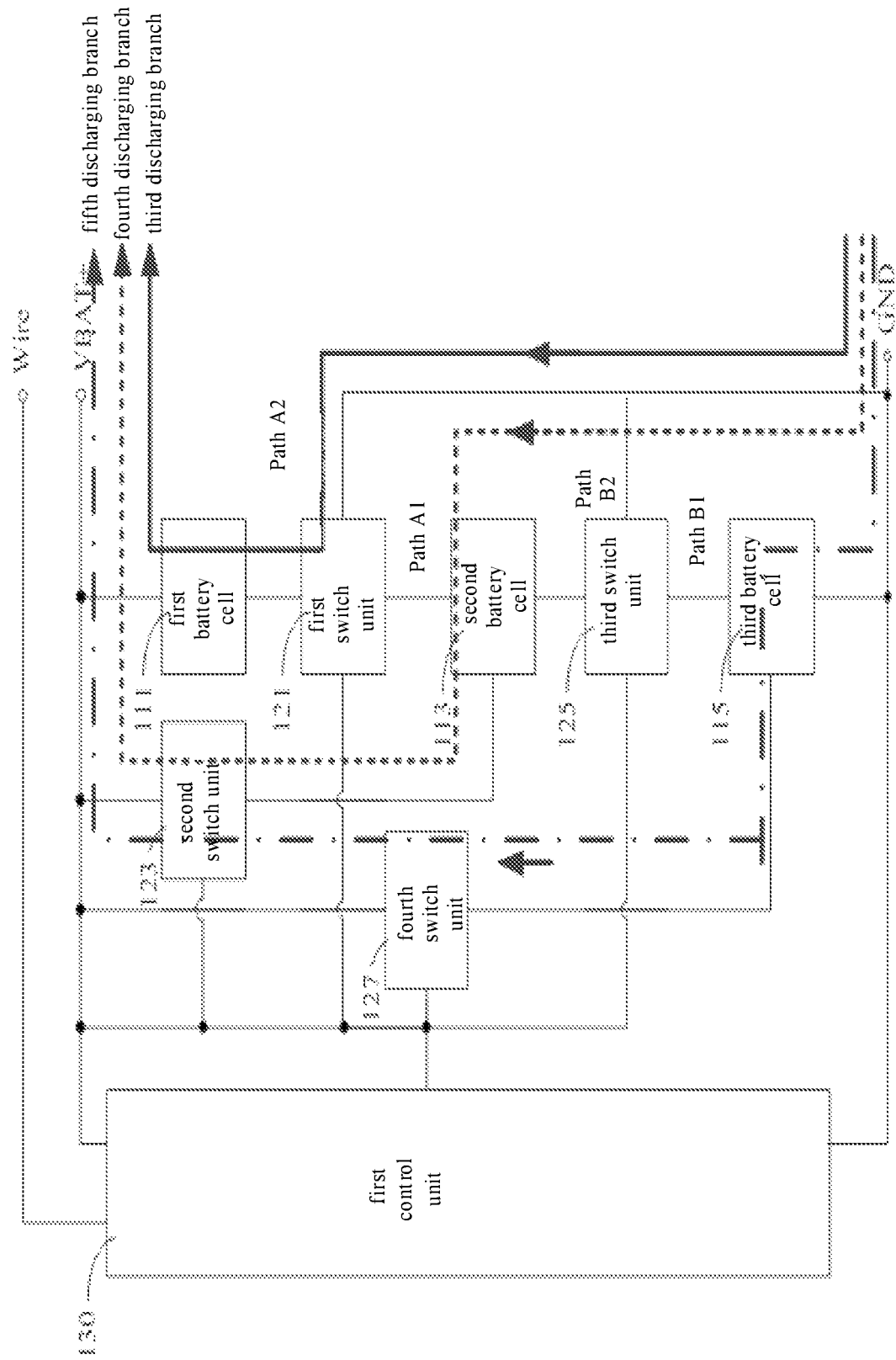
FIG. 5 is a schematic diagram of current flow direction of a battery control system supplying power to a load according to another embodiment.

The second control unit 160 is coupled to the interface module 140 and the first switch module 150 and is configured to identify the external charging device. When the external charging device is the preset charging device, the second control unit 160 controls the first switch module 150 to be turned on to form a path between the charging port VBUS and the positive output end VBAT+ to supply power to the load. Meanwhile, the second control unit 160 is also configured to output the charging control signal to the first control unit 130, to enable the external charging device simultaneously to charge the battery components coupled in series. Further, the second control unit 160 is correspondingly coupled to the first switch module 150 and charging port USB+ and USB−. FIG. 5 illustrates current flow directions when the preset charging device charges the battery components and supplies power to the load. The arrow of the solid line in the FIG. 5 illustrates the current flow direction when the preset charging device charges the battery components coupled in series to achieve fast charging that has high voltage and large current, and the arrow of the dashed line in the FIG. 5 is the current flow direction when the preset charging device supplies power to the load.

In an embodiment, when the external charging device simultaneously charge a number of the battery components 120 coupled in series, in response to the output voltages of the battery components 120 being different and a voltage difference between any two battery components exceeding a preset threshold, the battery components may be balanced.

In an embodiment, an output voltage range of the preset charging device may be 4V to 9V. The battery control system further includes a step-down module 170. The step-down module 170 is coupled to the first switch module 150 and the load correspondingly. The step-down module 170 is configured to reduce a voltage output of the external charging device for supplying power to the load. When the preset charging device supplies power to the load, the step-down module 170 performs a step-down process on a charging voltage output by the preset charging device, and then supplies power to the load to meet the requirements for supplying power to the load.

In an embodiment, the step-down module 170 may also be arranged between the first switch module 150 and the battery component 110. The step-down module 170 may be configured to perform the step-down process on the charging voltage output by the preset charging device and then to charge the various battery components.

Figure 7:
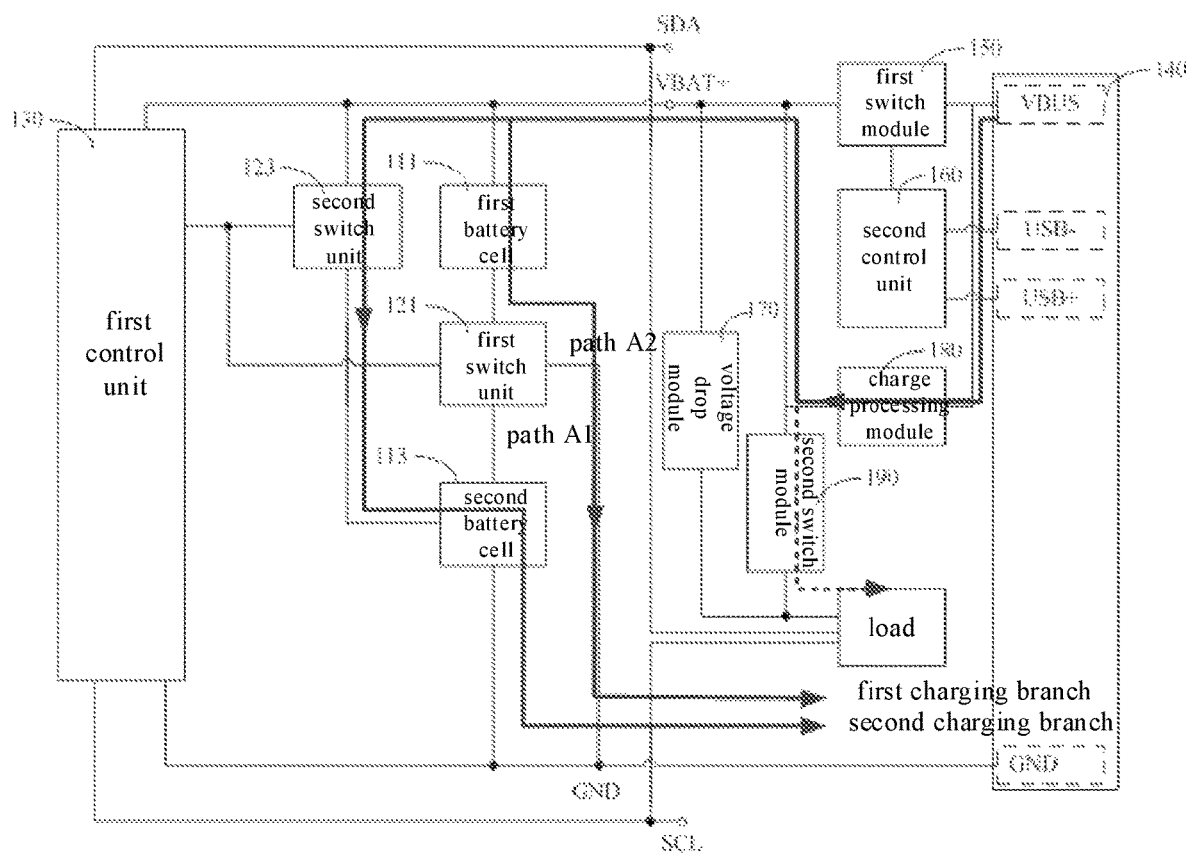
FIG. 7 is a schematic diagram of a current flow direction of a battery control system charging battery components according to yet another embodiment.

As illustrated in FIG. 7, in an embodiment, the battery control system further includes a charge processing module 180 and a second switch module 190. The charge processing module 180 is correspondingly coupled to the interface module 140, the second control unit 160 and the first control unit 130, and is configured to supply power to the load. In an embodiment, the charge processing module 180 is correspondingly coupled to the charging port VBUS, the positive output end VBAT+ of the battery control system and the second switch module 190. The charge processing module 180 is considered as a charging chip (i.e., a charging IC) for receiving a voltage signal output by the external charging device, and processing the voltage signal to output a stable voltage signal to supply power to the load.

The second switch module 190 is correspondingly coupled to the charge processing module 180, the first control unit 130, the first switch module 150, and the load, and is configured to turn on or turn off the path formed by the charge processing module 180 and the load. In an embodiment, the second switch module 190 is correspondingly coupled to the charge processing module 180, the positive output end VBAT+ of the battery control system, the first switch module 150, and the load.

When the battery control system is coupled to the charging device, the second control unit 160 may identify the resistance value of the fixed resistor on D+ or D− of the charging device, and then determine whether the charging device is the preset charging device. In response to the charging device being not the preset charging device, the second control unit 160 may control the first switch module 150 to be turned off and the second switch module 190 to be turned on, such that a first path for supplying power from VBUS to the load via the charge processing module 180 and a second path for charging to the positive output end VBAT+ from the VBUS via the charge processing module 180 are formed. The external charging device supplies power to the load based on the first path. The second control unit 160 is further configured to control the switching of a number of the switch units 120 according to a charging instruction output to the first control unit 130 based on the second path, to enable the external charging device to charge each of the battery components 110 coupled in parallel.

In an embodiment, when the first control unit 130 receives the charging signal, the corresponding switching instruction is output to the first switch unit 121 and the second switch unit 123. The first switch unit 121 is switched to the path A2 to form the first charging path. Meanwhile, the second switch unit 123 is turned on to form a second charging path. The first battery component 111 and the second battery component 113 are coupled in parallel. That is, the voltage of the VBUS output by the external charging device is transformed by the charge processing module 180 to charge each battery component of the battery pack. Reference to FIG. 7 illustrated flow directions of charging currents, the arrow of the solid line is the current flow direction when the charging device charges a number of the battery components coupled in parallel, and the arrow of the dashed line is the current flow direction when the charging device supplies power to the load.

Figure 8:
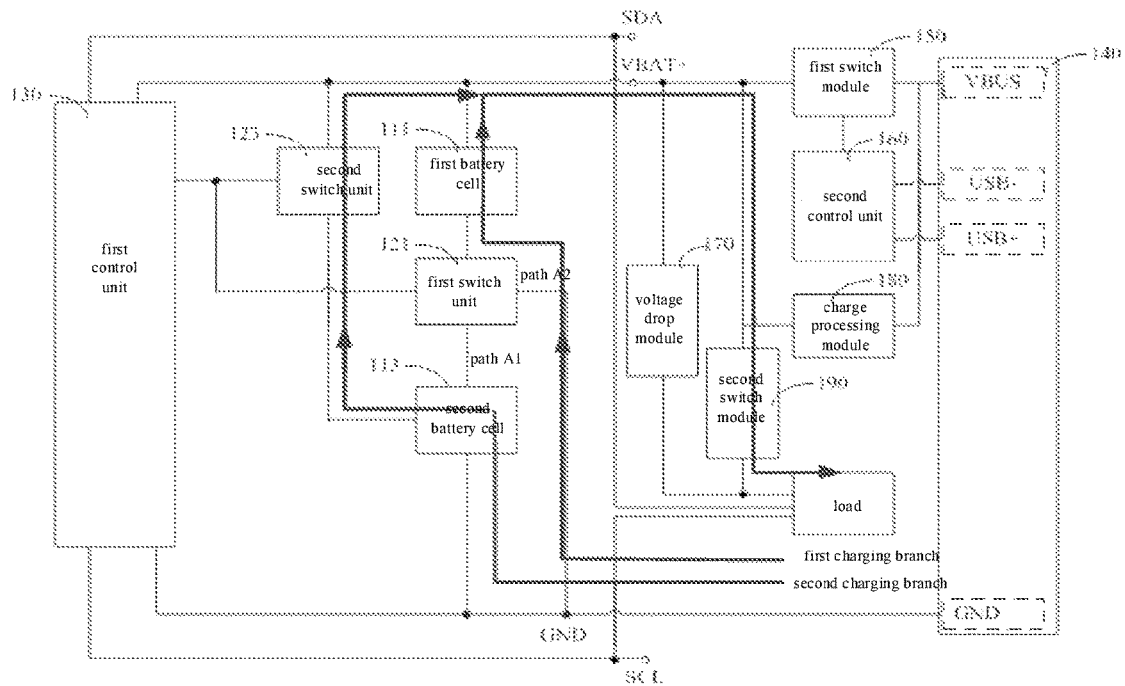
FIG. 8 is a schematic diagram of a current flow direction of a battery control system supplying power to a load according to another embodiment.

As illustrated in FIG. 8, in an embodiment, when the multi-batteries charging system is not coupled to the external charging device and is to be supplied power to the load, the first control unit 130 outputs the corresponding second switching instruction to the first switch unit 121 and the second switch unit 123 according to the discharging control signal, such that the input end of the first switch unit 121 is controlled to be coupled to the second output end (that is, switch to the path A2), and simultaneously, the second switch unit 123 is controlled to be turned on, such that the first battery component 111 and the first switch cell 121 form the first discharging path, and the second switch unit 123 and the second battery component 113 form a second discharging path, that is, the first battery component 111 and the second battery component 113 are coupled in parallel, as illustrated in FIG. 8. Meanwhile, the first control unit 130 outputs the corresponding switching instruction to the first switch module 150 and the second switch module 190 according to the discharging control signal, and controls the first switch module 150 to turn off and the second switch module 190 to turn on, to supply power to the load.

In an embodiment, when the battery control system includes at least one of the interface module 140, the first switch module 150, the step-down module 170, the second control unit 160, the charge processing module 180, and the second switch module 190, the number of the battery components in the battery control system may be three, four, five or even more, and is not limited to the two battery components as illustrated in the above embodiment. The embodiments in which the number of the battery components in the battery control system may be three, four, five or even more are not repeated here.

In an embodiment, the battery control system of the battery pack included three, four, five, or even more battery components communicates with the load in ways such as I2C communication and single-wire communication. The first switching instruction, the second switching instruction, and the third switching instruction are stored and sent according to the preset rules corresponding to the communication protocol, according to different communication ways, as described in the foregoing embodiments, which will not be repeated here.

The division of modules and units in the battery control system described above is only for illustration. In other embodiments, the battery control system is divided into different modules and units as needed to complete all or part of the functions of the battery control system.

Each module and unit in the above battery control system is implemented in whole or in part by software, hardware, and a combination thereof. The above modules and units are embedded in the form of hardware or independent of the processor in the computer device, or stored in the memory of the computer device in the form of software, so that the processor calls and executes the corresponding operations of the above modules and units.

Figure 9:
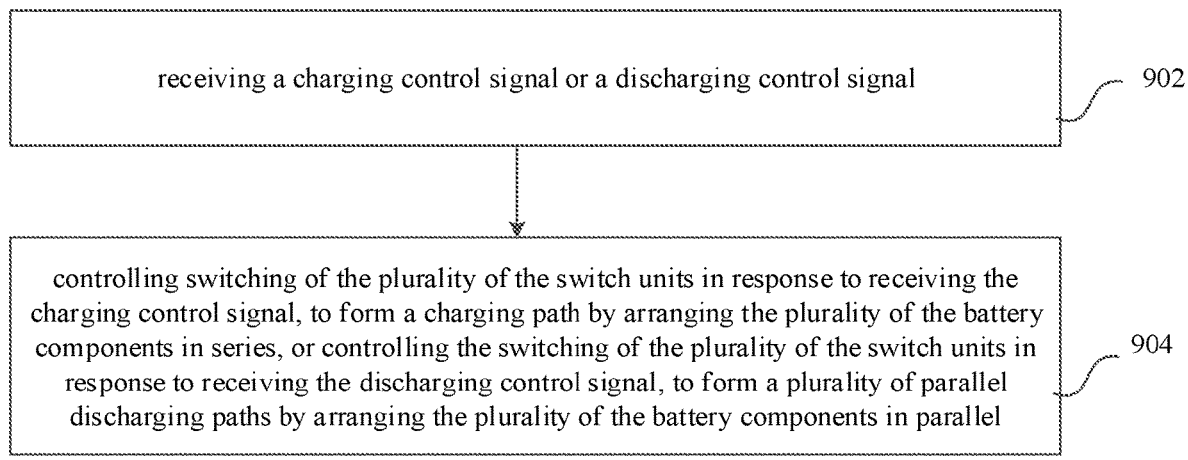
FIG. 9 is a flowchart of a battery control method according to an embodiment.

This disclosure also provides a battery control method, which is applicable to the battery control system. The battery control system includes a number of the battery components and a number of switch units. The battery components are configured to store electric energy and supply power to a load. A number of the switch units are coupled to a number of the battery components. As illustrated in FIG. 9, the battery control method includes acts 902-904.

At act 902, a charging control signal or a discharging control signal are received.

The charging control signal and the discharging control signal may be obtained according to remaining power of the battery component or by the external charging device coupled to the battery control system. For example, when the remaining power of the battery component is lower than a preset value, the charging control signal is output to charge the battery component; or, when the external charging device is coupled to the battery control system, the charging control signal is output, and the external charging device is configured to charge the load and the battery components. When there is no external charging device coupled to the battery control system, the discharging control signal is output, and the electric energy stored in the battery components is supplied to the load.

The charging control signal is configured to instruct a number of the battery components to be coupled in series to form the series charging path, and the discharging control signal is configured to instruct a number of the battery components to be coupled in parallel to form the parallel charging paths.

At act 904, switching of a number of the switch units are controlled in responding to receiving the charging control signal, to form a series charging path by arranging a number of the battery components to be coupled in series, and the switching of a number of the switch units are controlled in responding to receiving the discharging control signal, to form a number of parallel discharge paths by arranging a number of the battery components to be coupled in parallel.

In an embodiment, the battery control system controls the on and off of a number of the switch units according to the received charging control signal, so that a number of the battery components are coupled in series to form the series charging path, and furthermore, a number of the battery components are charged based on the external charging device and the series charging path. After the series charging path is formed, a total charging voltage of the battery pack included a number of the battery components is a sum of an output voltages of various battery components.

In an embodiment, the battery control system controls the on and off of a number of the switch units according to the received discharging control signal, and finally, the battery components are coupled in parallel to form a number of the parallel discharging paths. At this time, when the output voltages of the various battery components are the same, the total output voltage of the battery pack included a number of the battery components is a current output voltage of any battery component. When input voltages of the various battery components are different, the total output voltage of the battery pack is obtained according to the output voltage of the various battery components, according to a parallel voltage calculation method.

In the above battery control method, the on and off of each switch unit is controlled according to the received charging control signal, and a number of the battery components are coupled in series to form the series charging path, the on and off of the various switch units are controlled according to the received discharging control signal, such that the battery components are coupled in parallel with each other to form a number of the parallel discharging paths. Therefore, diversified charging voltage and -discharging voltage are generated to provide a charging mode that has high voltage and large current and to improve charging efficiency. After the charging having high voltage and large current is completed, a number of the battery components may output electric energy within a voltage range for normal load.

Figure 10:
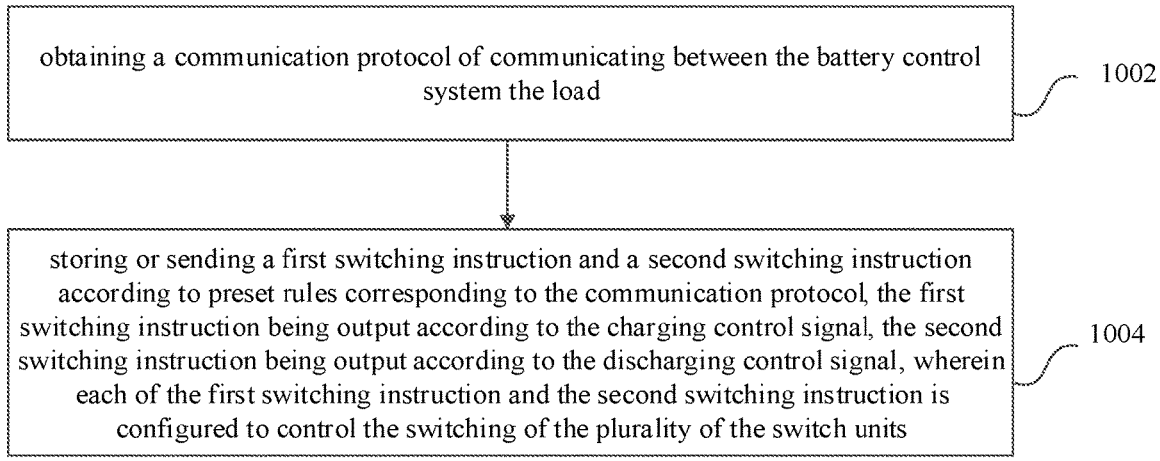
FIG. 10 is a flowchart of a battery control method according to another embodiment.

As illustrated in FIG. 10, the battery control method further includes the following acts.

At act 1002, a communication protocol for communicating between the battery control system and the load is obtained.

The battery control system and the load communicate through I2C communication protocol or single wire communication protocol. For example, the communication interface of the logic control unit for sending the first switching instruction in the battery control system is detected. When the communication interface is equipped with the I2C communication interface for coupling to the SDA and the SCL, it is considered that the battery control system communicates with the load based on the I2C communication protocol. When the communication interface is equipped with a single-wire communication interface of a single-wire communication line, it is considered that the battery control system communicates with the load based on a single-wire communication protocol.

Optionally, the communication protocol for communication between the battery control system and the load is preset and stored in the battery control system, and the communication protocol is directly retrieved from the battery control system.

At act 1004, a first switching instruction or a second switching instruction are stored and sent according to preset rules corresponding to the communication protocol. The first switching instruction is output according to the charging control signal, and the second switching instruction is output according to the discharging control signal. Each of the first switching instruction and the second switching instruction may be configured to control the switching of the a number of the switch units. The first switching instruction and the second switching instruction may be level signals or pulse signals.

The switching of each switch unit is controlled by itself according to the received first switching instruction. The first switching instruction received by each switch unit may be the same or different. For example, the first switching instruction received by the first switch unit is configured to instruct the first switch unit to turn on, and the first switching instruction received by the second switch unit is configured to instruct the second switch unit to be turned off and disconnected.

The battery control system may output the first switching instruction for controlling the switching of each switch unit according to the charging control signal, and finally a number of the battery components are coupled in series to form the series charging path. The battery control system may output the second switching instruction for controlling the switching of each switch unit according to the discharging control signal, and finally a number of the battery components are coupled in parallel to form the parallel charging paths.

The switching of each switch unit is controlled by itself according to the received first switching instruction or second switching instruction. The first switching instruction and the second switching instruction received by each of switch units may be the same or different. For example, the first switching instruction received by the first switch unit is configured to instruct the first switch unit to turn on, and the second switching instruction received by the first switch unit is configured to instruct the first switch unit to be turned off and disconnected.

When the communication protocol between the battery control system and the load is the I2C communication protocol, the first switching instruction and the second switching instruction are sent according to the preset rules corresponding to the communication protocol. For example, a register is provided in a logic control unit, and the first switching instruction and the second switching instruction for controlling a number of the switch units are directly written into the register, so as to realize the switching of a number of the switch units. For example, the first switching instruction and the second switching instruction are stored in the form of levels. "1" represents a high-level signal for controlling c the switch units to turn on, and "0" represents a low-level signal for controlling the switch units to turn off.

When the communication protocol between the battery control system and the load is the single-wire protocol, the first switching instruction and the second switching instruction are sent according to the preset rules corresponding to the communication protocol. For example, the first switching instruction and the second switching instruction are stored and sent in the form of pulse signals. For example, the load first sends 8 pulse signals on the single-wire communication line to inform the first control unit 130 to prepare for operations. After receiving the pulse signal sent by the load, the first control unit 130 responds with 8 pulse signals, indicating that the first control unit 130 is ready. When the load sends 1 pulse signal, it indicates that the first switch unit 121 is disconnected or turned off. When the load sends 2 pulse signals, it indicates the first switch unit 121 is connected or turned on. When the load sends 3 pulse signals, it indicates the second switch unit 123 is disconnected or turned off. When the load sends 4 pulse signals, it indicates that the second switch unit 123 is turned on and switched to the path A. When the load sends 5 pulse signals, it indicates that the second switch unit 123 is turned on and switched to path B.

In an embodiment, the battery control system further includes an interface module and the first switch module. The interface module is configured to couple to the external charging device. The first switch module is configured to turn on or turn off a path formed between the interface module and a number of the battery components.

Figure 11:
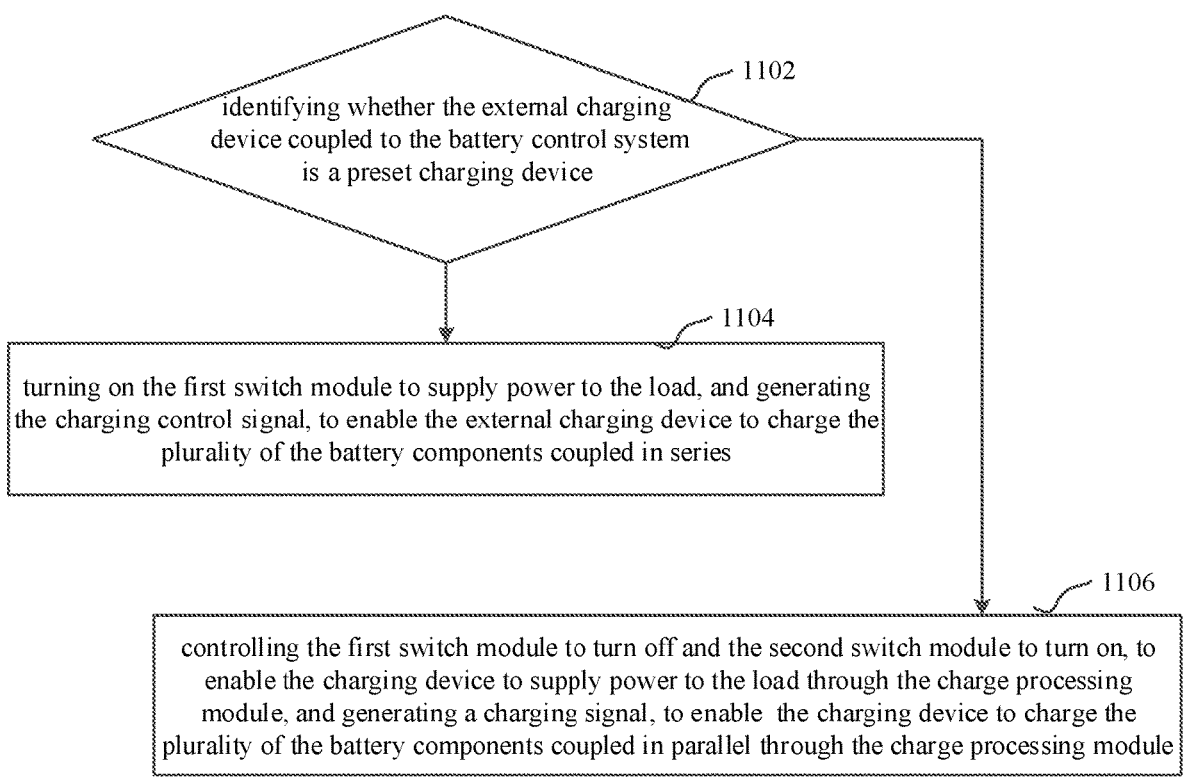
FIG. 11 is a flowchart of a battery control method according to yet another embodiment.

As illustrated in FIG. 11, the battery control method also includes the following acts.

At act 1102, whether the external charging device coupled to the battery control system is a preset charging device is identified.

The interface module is configured to couple to the external charging devices, and the interface module includes charging ports of VBUS, USB+, USB−, GND. The preset charging devices are understood as a fast charger or a fast charging adapter that provide fast charging for the load. The USB signal in the external charging device is a differential signal, and its signal lines are D+ and D−. D+ or D− of the external charging device is provided with a fixed pull-up or pull-down resistor. The USB 1.0/1.1/2.0 protocol defines high/low-speed devices to meet requirements of different situations. For example, D+ of a high-speed device is coupled to a 1.5 kohm pull-up resistor, and D− is not coupled. However the situation of a low-speed device is the opposite. When the battery control system is coupled to the charging device, the battery control system may identify a resistance value of the fixed resistor on D+ or D− of the charging device, and then determine whether the charging device is the preset charging device.

At act 1104, in response to the external charging device being the preset charging device, the first switch module is turned on to supply power to the load, and the charging control signal is generated, to enable the external charging device to charge a number of the battery components coupled in series.

As illustrated in FIG. 6, when the charging device is the preset charging device, the battery control system controls the first switch module to be turned on to form the path between the charging port VBUS and the positive output end VBAT+, and then supplies power to the load. Meanwhile, the battery control system generates the charging control signal, and controls the switching of a number of the switch units according to the charging control signal, also a number of the battery components are coupled in series to form the series charging branches, to enable the preset charging device simultaneously to charge the battery components coupled in series.

In an embodiment, the battery control system further includes a charge processing module and a second switch module. The charge processing module is configured to supply power to the load, and the second switch module is configured to turn on or turn off the path formed between the charge processing module and the load. The battery control method also includes the following acts.

At act 1106, in response to the charging device being not the preset charging device, the first switch module is controlled to turn off and the second switch module is controlled to turn on, to enable the charging device to supply power to the load through the charge processing module, and a charging signal is generated, to enable the charging device to charge a number of the battery components coupled in parallel through the charge processing module.

When the battery control system is coupled to the charging device, the battery control system may identify a resistance value of the fixed resistor on D+ or D− of the charging device, and then determine whether the charging device is the preset charging device. As illustrated in FIG. 7, when the charging device is not the preset charging device, the first switch module is controlled to turn off and the second switch module is controlled to turn on by the battery control system. A first path for supplying power from the charging port VBUS to the load via the charge processing module and a second path for charging to the positive output end VBAT+ from the VBUS via the charge processing module 180 are formed. And then the load is supplied power based on the first path. The battery control system is also configured to generate the charging signal, so that the charging device charges the battery components coupled in parallel through the charge processing module. For example, the multi-batteries system also outputs the corresponding switching instruction to the first switch unit and the second switching unit simultaneously. The first switch unit is switched to the path A2 to turn on the first charging path. Meanwhile, the second switch unit is turned on to form the second charging path. The first battery component and the second battery component are coupled in parallel. That is, the VBUS voltage output by the external charging device is transformed by the charge processing module to charge each battery component of the battery pack.

In an embodiment, the battery control method further includes the following acts. In response to the battery control system being not coupled to the charging device, a discharge control instruction is generated to control switching of a number of switch units, to enable the battery components to be coupled in parallel to form a number of parallel discharging paths to supply power to the load.

In an embodiment, as illustrated in FIG. 8, when the multi-batteries charging system is not coupled to the external charging devices and is to be supplied power to the load, the battery control system outputs the second switching instruction to the first switch unit according to the discharging control signal. The second switch unit controls the input end of the first switch unit to couple to the second output end (that is, switching to the path A2), and meanwhile, the second switch unit 123 is controlled to be turned on, to enable the first battery component 111 and the first switch unit to form the first discharging path, and the second switch unit 123 and the second battery component form the second discharging path. That is, the first battery component and the second battery component are coupled in parallel. Meanwhile, the battery control system outputs the corresponding switching instruction to the first switch module and the second switch module according to the discharging control signal, and controls the first switch module to be turned off and the second switch module to be turned on to supply power to the load. That is, the first battery component and the second battery component are coupled in parallel, and supply power to the load.

It should be understood that although the various operations in the flowcharts of FIGS. 9-11 are displayed in sequence as indicated by arrows, these operations are not necessarily performed in sequence in the order indicated by the arrows. Unless explicitly stated in this article, there is no strict order for the execution of these operations, and these operations could be executed in other orders. Moreover, at least part of the operations in FIGS. 9-11 may include a number of sub-operations or stages. These sub-operations or stages are not necessarily executed at the same time, and could be executed at different times. The execution order of these sub-operations or stages is not necessarily performed sequentially, but may be performed alternately or by turns with other operations or at least part of the sub-operations or stages of other operations.

The embodiments of the present disclosure further provide an electronic device, including the battery control system according to any of the above embodiments. The battery control system is configured to store electrical energy and supply power to a load.

The embodiments of the present disclosure further provide a computer-readable storage medium. One or more non-volatile computer-readable storage medium including computer-executable instructions, when the computer-executable instructions are executed by one or more processors, the one or more processors are caused to perform operations of the battery control method.

The embodiments of the present disclosure further provide a computer program product including instructions, when the instructions are executed on a computer, the computer is caused to execute the battery control method according to the above embodiments.

Figure 12:
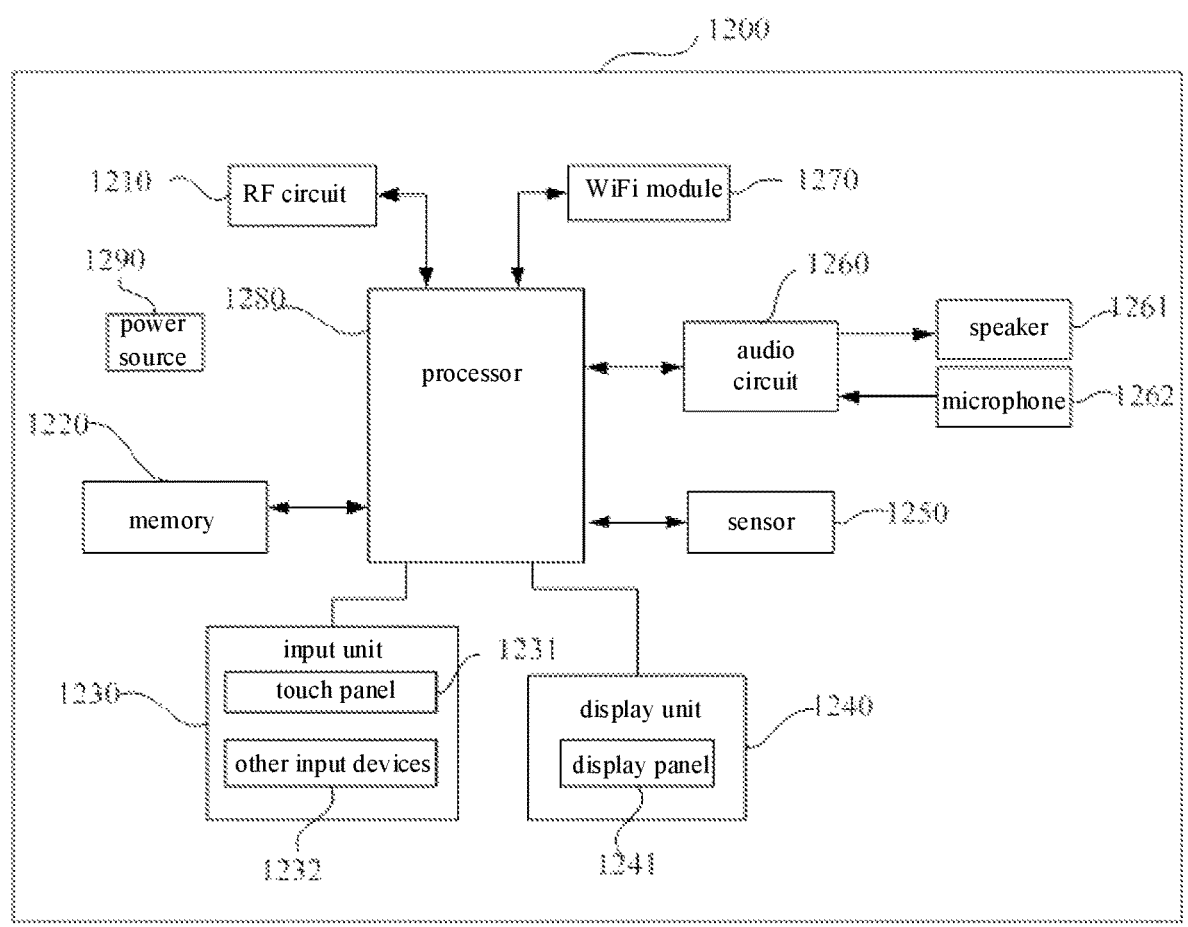
FIG. 12 is a block diagram of a partial structure of a mobile phone related to an electronic device according to an embodiment of the present disclosure.

The embodiments of the present disclosure further provide an electronic device. As illustrated in FIG. 12, for convenience of description, only the parts related to the embodiment of the present disclosure are shown, and for specific technical details that are not disclosed, please refer to the method embodiments of the present disclosure. The electronic device may be any terminal device such as a mobile phone, a tablet computer, a personal digital assistant (PDA), a point of sales (POS), an in-vehicle computer and a wearable device, or electronic devices such as mobile powers, power banks, and chargers. The electronic device refers to a mobile phone in this application.

FIG. 12 is a block diagram of a partial structure of a mobile phone related to an electronic device according to an embodiment of the present disclosure. As illustrated in FIG. 12, the mobile phone includes a radio frequency (RF) circuit 1210, a memory 1220, an input unit 1230, a display unit 1240, a sensor 1250, an audio circuit 1260, a wireless fidelity (WiFi) module 1270, a processor 1280, and a power source 1290. Those skilled in the art can understand that the structure of the mobile phone shown in FIG. 12 does not constitute a limitation on the mobile phone, and may include more or fewer components than those shown in the figure, or a combination of some components, or has different component arrangement.

The RF circuitry 1210 may be configured to receive or transmit a signal during a process of transmitting or receiving a message or making a call. In at least one embodiment, after downlink data of a base station is received, the downlink data is transmitted to the processor 1280 for processing. Additionally, uplink data related is transmitted to the base station. In general, the RF circuitry includes, but not limited to, an antenna, at least one amplifier, a transceiver, a coupler, a low noise amplifier (LNA), a diplexer and the like. Furthermore, the RF circuitry 1210 may be further configured to communicate with other devices via wireless communication and network. The wireless communication may adopt any communication standard or protocol, which includes, but not limited to, global system of mobile communication (GSM), general packet radio service (GPRS), code division multiple access (CDMA), wideband code division multiple access (WCDMA), long term evolution (LTE), e-mail, short messaging service (SMS) and the like.

The memory 1220 may be configured to store application programs or modules. The processor 1280 is configured to execute various functional applications and data processes by running the applications programs and modules stored in the memory 1220. The memory 1220 may include a program storage region and a data storage region. The program storage region may store an operation system, at least one function-required application programs (such as sound playing function, image displaying function) and the like. The data storage region may store data produced by using the mobile terminal (such as audio data, a contact book) and the like. In addition, the memory 1220 may include a high speed random access memory and may include a non-volatility memory, such as at least one disk memory, a flash memory, or other volatility solid state memory.

The input unit 1230 may be configured to receive figures, character information and generate key signal inputs related to user settings and function control of the mobile phone 1200. Specifically, the input unit 1230 may include touch-sensitive surface 1231 and other input devices 1232. The touch-sensitive surface 1231 may be called as a touch panel, and may be configured to collect touch operations near or on the touch-sensitive surface (such as an operation of a user on the touch-sensitive surface or near the touch-sensitive surface with a finger, a stylus or other suitable objects or attachments), and drive corresponding connected device according to a preset program. In an embodiment, the touch-sensitive surface 1231 may include a touch detection device and a touch controller. The touch detection device is configured to detect an orientation of the user's touch, detect a signal caused by the touch operation and send the signal to the touch controller. The touch controller is configured to receive the touch information on the touch detection device, convert the touch information to touch point coordinates, and send the touch point coordinates to the processor 1280. Furthermore, the touch controller may receive and execute a command sent from the processor 1280. In addition, the touch-sensitive surface may be implemented as resistance typed, capacitive typed, infrared typed and surface acoustic wave typed. In addition to the touch-sensitive surface 1231, the input unit 1230 may further include other input devices 1232. In detail, the other input devices 1232 may include, but not limited to, one or more of a physical keyboard, a functional key (such as a volume control key and an on/off key).

The display unit 1240 may be configured to display information inputted by the user or information provided to the user or various menus of the mobile phone. The display unit 1240 may include a display panel 1241. In an embodiment, the display panel may be configured as a liquid crystal display (LCD), an organic light-emitting diode (OLED) and the like. Further, the touch-sensitive surface 1231 may cover the display panel 1241. When the touch-sensitive surface 1231 detects the touch operation on or near the touch-sensitive surface, the touch operation is transmitted to the processor 1280 to determine a type of the touch event. Thereafter, the processor 1280 provides a corresponding visual output on the display panel 1241 according to the type of the touch event. Although the touch-sensitive surface 1231 and the display panel 1241 are used as two separate components to realize an input and output functions illustrated in FIG. 12, in certain embodiments, the touch-sensitive surface 1231 and the display panel 1241 may be integrated to realize the input and output functions.

The mobile terminal 1200 may further include at least one sensor 1250, such as an optical sensor, a motion sensor and other sensors. In detail, the optical sensor may include a surrounding light sensor and a proximity sensor. The surrounding light sensor may adjust a brightness of the display panel 1241 according to brightness of the surrounding lights. The proximity sensor may light the display panel 1241 and/or backlight unit off when the mobile terminal moves near ears of the user. The motion sensor may include an acceleration sensor. The acceleration sensor detects the magnitude of acceleration in various directions. In a stationary state, the magnitude and direction of gravity are detected by the acceleration sensor, which is configured to identify mobile phone gestures (such as horizontal and vertical screen switching) and vibration recognition related functions (such as a pedometer, knocking). Furthermore, the mobile terminal may be configured with a gyroscope, a barometer, a thermometer, an infrared sensor and other sensors.

The audio circuit 1260, the speaker 1261, and the microphone 1262 may provide an audio interface between the user and the mobile phone. The audio circuit 1260 may transmit electric signals converted by the received audio data to the speaker 1261, and the speaker 1261 converts it into a sound signal for output. On the other hand, the microphone 1262 converts the collected sound signal into an electric signal, the audio circuit 1260 receives the electric signal and convert the electric signal into voice data, and forward the voice data to the output processor 1280 for processing, then the processed voice data is sent to another phone through RF circuit 1210, or output to the memory 1220 for subsequent processing.

WiFi is a short-range wireless transmission technology. The mobile phone helps users send and receive e-mail, browse web pages, and access streaming media through the WiFi module 1270. It provides users with wireless broadband Internet access. Although FIG. 12 shows the WiFi module 1270, it can be understood that the WiFi module 1270 does not belong to the necessary configuration of the mobile phone 1200, and can be omitted as needed.

The processor 1280 is a control center of the mobile phone, and uses various interfaces and lines to connect various parts of the entire mobile phone. By running or executing software programs and/or modules stored in the memory 1220, and calling data stored in the memory 1220, various functions of the mobile phone and data processing are executed, so as to monitor the mobile phone as a whole. In an embodiment, the processor 1280 may include one or more processing units. In an embodiment, the processor 1280 may integrate an application processor and a modem-demodulation processor, in which the application processor mainly processes an operating system, a user interface, and an application program, and the like, and the modem-demodulation processor mainly processes wireless communications. It is understood that the foregoing modem-demodulation processor may not be integrated into the processor 1280.

The mobile phone 1200 further includes a power source 1290 (such as a battery) for supplying power to various components. The power source can be logically connected with the processor 1280 through a power management system, so as to implement functions such as managing charging, discharging, and power consumption management through the power management system. The power source 1290 includes a number of battery components and a number of switch units coupled to a number of battery components in a one-to-one correspondence. The power source 1290 may be a power supply device in an embodiment of the present disclosure.

In an embodiment, the mobile phone 1100 may further include a camera, and a Bluetooth module.

In an embodiment of the present disclosure, when the processor 1180 included in the electronic device implements the battery control method provided in the foregoing embodiment by executing a computer program stored in the memory.

Any reference to memory, storage, database, or other media used in this application may include non-volatile and/or volatile memory. Suitable non-volatile memory may include read-only memory (ROM), programmable ROM (PROM), electrically programmable ROM (EPROM), electrically erasable programmable ROM (EEPROM), or flash memory. Volatile memory can include random access memory (RAM), which is used as external cache memory. By way of illustration and not limitation, RAM is available in various forms, such as static RAM (SRAM), dynamic RAM (DRAM), synchronous DRAM (SDRAM), dual data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The above-mentioned embodiments only express several implementations of the present application, and the descriptions thereof are more specific and detailed, but cannot be understood as limiting the scope of the invention patent. It should be noted that, for those of ordinary skill in the art, without departing from the concept of the present application, several modifications and improvements can be made, and these all belong to the protection scope of the present application. Therefore, the protection scope of this application shall be referred to the appended claims.

What is claimed is:

1. A battery control system, comprising:
a plurality of battery components configured to store electrical energy and to supply power to a load;
a plurality of switch units coupled to the plurality of the battery components and configured to switch connection modes of the plurality of battery components to form various types of charging-discharging paths;
a first control unit coupled to the plurality of the switch units correspondingly and configured to control switching of the plurality of the switch units in response to receiving a charging control signal, to form a series charging path by arranging the plurality of the battery components in series, or configured to control the switching of the plurality of the switch units in response to receiving a discharging control signal, to form a plurality of parallel discharging paths by arranging the plurality of the battery components in parallel;
an interface module, configured to be coupled to an external charging device;
a first switch module coupled to the interface module and the first control unit correspondingly, and configured to turn on or turn off a path formed by the interface module and the first control unit;
a second control unit coupled to the first switch module;
a charge processing module coupled to the interface module, the second control unit, and the first control unit correspondingly, and configured to supply power to the load; and
a second switch module coupled to the charge processing module, the first control unit, the first switch module, and the load correspondingly, wherein the second switch module is configured to turn on or turn off a path formed by the charge processing module and the load;
wherein the second control unit is further configured to control the first switch module to turn off and the second switch module to turn on in response to the external charging device being not the preset charging device to enable the external charging device to supply power to the load and to output a charging instruction to the first control unit to control the switching of the plurality of switch units to enable the external charging device to charge each of the battery components coupled in parallel.

2. The battery control system according to claim 1, wherein the first control unit is configured to output a first switching instruction for controlling the switching of the plurality of the switch units according to the received charging control signal, or to output a second switching instruction for controlling the switching of the plurality of the switch units according to the received discharging control signal, wherein the first switching instruction and the second switching instruction are stored in the first control unit according to preset rules.

3. The battery control system according to claim 2, wherein the first control unit is further configured to detect a communication protocol between the battery control system and the load, and send the first switching instruction and the second switching instruction according to the preset rules corresponding to the communication protocol.

4. The battery control system according to claim 1, wherein the plurality of the battery components comprise a first battery component and a second battery component, the plurality of the switch units comprise a first switch unit and a second switch unit, and the first control unit is coupled to the first switch unit and the second switch unit correspondingly;
the first control unit is configured to control the first battery component, the second switch unit, and the second battery component to be coupled in sequence to form a first series charging-discharging path; and
the first control unit is further configured to control the first battery component and the first switch unit to be coupled to form a first charging-discharging path, and control the second switch unit and the second battery component to be coupled to form a second charging-discharging path, wherein the first battery component is coupled in parallel to the second battery component.

5. The battery control system according to claim 1, wherein the second control unit is further configured to identify the external charging device, and control the first switch module to turn on to supply power to the load in response to the external charging device being a preset charging device, and output the charging control signal to the first control unit to enable the external charging device to charge the plurality of the battery components coupled in series.

6. The battery control system according to claim 5, further comprising:
a step-down module coupled to the first switch module and the load correspondingly, and configured to reduce a voltage output by the external charging device for supplying power to the load.

7. A battery control method, applicable to a battery control system, wherein the battery control system comprises a plurality of battery components, a plurality of switch units, an interface module, a first switch module, a charge processing module, and a second switch module, wherein the plurality of the battery components are configured to store electrical energy and supply power to a load, wherein the plurality of the switch units are coupled to the plurality of the battery components, wherein the interface module is configured to be coupled to an external charging device, wherein the first switch module is configured to turn on or turn off a path formed between the interface module and the plurality of battery components, wherein the charge processing module is configured to supply power to the load, wherein the second switch module is configured to turn on or turn off a path formed between the charge processing module and the load, and wherein the method comprises:
receiving a charging control signal or a discharging control signal;
controlling switching of the plurality of the switch units in response to receiving the charging control signal, to form a charging path by arranging the plurality of the battery components in series, or controlling the switching of the plurality of the switch units in response to receiving the discharging control signal, to form a plurality of parallel discharging paths by arranging the plurality of the battery components in parallel; and
in response to the charging device being not the preset charging device, controlling the first switch module to turn off and the second switch module to turn on, to enable the charging device to supply power to the load through the charge processing module, and generating a charging signal, to enable the charging device to charge the plurality of the battery components coupled in parallel through the charge processing module.

8. The method according to claim 7, further comprising:
obtaining a communication protocol of communicating between the battery control system the load; and
storing and sending a first switching instruction or a second switching instruction according to preset rules corresponding to the communication protocol, the first switching instruction being output according to the charging control signal, the second switching instruction being output according to the discharging control signal, wherein each of the first switching instruction and the second switching instruction is configured to control the switching of the plurality of the switch units.

9. The method according to claim 7, wherein the method further comprises:
identifying whether the external charging device coupled to the battery control system is a preset charging device; and
in response to the external charging device being the preset charging device, turning on the first switch module to supply power to the load, and generating the charging control signal, to enable the external charging device to charge the plurality of the battery components coupled in series.

10. The method according to claimer 7, further comprising:
in response to the battery control system being not coupled to the charging device, generating a discharging control instruction to control the switching of the plurality of switch units, to enable the battery components to be coupled in parallel to form a plurality of parallel discharging paths to supply power to the load.

11. An electronic device, comprising a plurality of battery components, a plurality of switch units, an interface module, a first switch module, a charge processing module, and a second switch module, a memory, and a processor, wherein the interface module is configured to be coupled to an external charging device, wherein the first switch module is configured to turn on or turn off a path formed between the interface module and the plurality of battery components, wherein the charge processing module is configured to supply power to the load, wherein the second switch module is configured to turn on or turn off a path formed between the charge processing module and the load, wherein the processor is coupled to the plurality of the battery components correspondingly, the plurality of the switch units, and the memory, wherein the memory is configured to store a computer program, and wherein when the computer program is executed by the processor, the processor is configured to perform the following acts:
receiving a charging control signal or a discharging control signal;
controlling switching of the plurality of the switch units in responding to receiving the charging control signal, to form a charging path by arranging the plurality of the battery components in series; or controlling the switching of the plurality of the switch units in responding to receiving the discharging control signal, to form a plurality of parallel discharging paths by arranging the plurality of the battery components in parallel; and
in response to the charging device being not the preset charging device, controlling the first switch module to turn off and the second switch module to turn on, to enable the charging device to supply power to the load through the charge processing module; and generating a charging signal, to enable the charging device to charge the plurality of the battery components coupled in parallel through the charge processing module.

12. The electronic device according to claim 11, wherein when the computer programs are executed by the processor, the processor is further configured to perform the following acts:
obtaining a communication protocol for communicating between the battery control system and the load; and
storing and sending a first switching instruction or a second switching instruction according to preset rules corresponding to the communication protocol, the first switching instruction being output according to the charging control signal, the second switching instruction being output according to the discharging control signal, wherein each of the first switching instruction and the second switching instruction is configured to control the switching of the plurality of the switch units.

13. The electronic device according to claim 11, wherein when the computer program is executed by the processor, the processor is further configured to perform the following acts:
identifying whether the external charging device coupled to the battery control system is a preset charging device; and
in response to the external charging device being the preset charging device, turning on the first switch module to supply power to the load, and generating the charging control signal, to enable the external charging device to charge the plurality of the battery components coupled in series.

14. The electronic device according to claim 11, wherein when the computer program is executed by the processor, the processor is further configured to perform the following acts:
in response to the battery control system being not coupled to the charging device, generating a discharging control instruction to control the switching of the plurality of switch units, to enable the battery components to be coupled in parallel to form a plurality of parallel discharging paths to supply power to the load.

* * * * *